United States Patent
Bierwirth

(10) Patent No.: US 10,046,728 B2
(45) Date of Patent: Aug. 14, 2018

(54) INFLATOR, ESPECIALLY FOR A VEHICLE SAFETY SYSTEM, AIRBAG MODULE, VEHICLE SAFETY SYSTEM AND METHOD OF MANUFACTURING AND OPERATING AN INFLATOR

(71) Applicant: TRW Airbag Systems GmbH, Aschau am Inn (DE)

(72) Inventor: Sebastian Bierwirth, Rechtmehring (DE)

(73) Assignee: TRW AIRBAG SYSTEMS GmbH (DE)

( * ) Notice: Subject to any disclaimer, the term of this patent is extended or adjusted under 35 U.S.C. 154(b) by 0 days.

(21) Appl. No.: 15/216,764

(22) Filed: Jul. 22, 2016

(65) Prior Publication Data

US 2017/0028964 A1 Feb. 2, 2017

(30) Foreign Application Priority Data

Jul. 30, 2015 (DE) .......... 10 2015 009 705

(51) Int. Cl.
*B60R 21/264* (2006.01)
*B60R 21/26* (2011.01)

(52) U.S. Cl.
CPC .......... *B60R 21/2646* (2013.01); *B60R 21/26* (2013.01); *B60R 21/2644* (2013.01); *B60R 2021/26011* (2013.01); *B60R 2021/2642* (2013.01); *B60R 2021/2648* (2013.01)

(58) Field of Classification Search
CPC . B60R 21/2646; B60R 21/2644; B60R 21/26; B60R 21/264; B60R 2021/2648; B60R 2021/26011; B60R 2021/2642
USPC .......... 280/741, 736, 737; 102/530
See application file for complete search history.

(56) References Cited

U.S. PATENT DOCUMENTS

2008/0143090 A1* 6/2008 Pack .................. B60R 21/2644
280/741
2014/0230685 A1 8/2014 Hanano et al.

* cited by examiner

*Primary Examiner* — Keith J Frisby
(74) *Attorney, Agent, or Firm* — Tarolli, Sundheim, Covell & Tummino LLP

(57) ABSTRACT

The invention relates to an inflator (10), especially for a vehicle safety system, comprising a combustion chamber (20) containing a pyrotechnical solid propellant bed (21). In accordance with the invention, an igniting mixture (25) is located in the combustion chamber (20), wherein a filler element (30, 30') is arranged to be movable between the igniting mixture (25) and the solid propellant bed (21) in the idle state of the inflator (10).

11 Claims, 2 Drawing Sheets

INFLATOR, ESPECIALLY FOR A VEHICLE SAFETY SYSTEM, AIRBAG MODULE, VEHICLE SAFETY SYSTEM AND METHOD OF MANUFACTURING AND OPERATING AN INFLATOR

RELATED APPLICATION

This application claims priority from German Patent Application No. 10 2015 009 705.9, filed Jul. 30, 2015, the subject matter of which is incorporated herein by reference.

BACKGROUND OF THE INVENTION

The invention relates to an inflator, especially for a vehicle safety system, comprising a combustion chamber containing a pyrotechnical solid propellant bed. Apart from that, the invention relates to an airbag module. Moreover, the invention relates to a vehicle safety system. The invention additionally relates to a method of manufacturing an inflator.

In numerous especially tubular inflators plural chambers are formed, i.e. an igniter chamber and a combustion chamber. In an igniter chamber usually an igniting mixture, also referred to as booster charge, is provided. On the other hand, in a fuel chamber a pyrotechnical solid propellant bed is provided.

From U.S. 2014/0230685 A1 a tubular inflator including an igniter chamber and a combustion chamber is known. Said two chambers are separated from each other by two plate-shaped elements. The plate-shaped elements are connected to the tubular casing of the inflator. A first plate-shaped element is pressed onto the propellant bed provided in the combustion chamber. During this manufacturing step propellant may break. Moreover, it is possible that cavities are retained in the propellant bed. The second plate-shaped element is pre-positioned in the tubular casing and, during mounting the igniter holder, is pushed toward the solid propellant bed together with the igniting mixture. After mounting the two plate-shaped elements, settlements within the propellant and/or within the igniting mixture cannot be compensated any longer.

SUMMARY OF THE INVENTION

It is the object of the present invention to state a further developed inflator, wherein settlements in the igniting mixture and in the solid propellant bed can be compensated. On the other hand, the further developed inflator is intended to comprise as few individual parts as possible and to be reduced in terms of weight. Moreover, a further developed airbag module is to be stated. The object further consists in providing a further developed vehicle safety system.

Advantageous and useful configurations of the inflator according to the invention are described in the subclaims.

The inflator according to the invention especially relates to an inflator for a vehicle safety system. The inflator comprises at least one combustion chamber including a pyrotechnical solid propellant bed.

In accordance with the invention, in the combustion chamber an igniting mixture is located apart from the solid propellant bad, wherein a filler element is arranged to be movable between the igniting mixture and the solid propellant bed in the idle state of the inflator.

In the combustion chamber of the inflator two pyrotechnical fillings are provided, i.e. the igniting mixture and the solid propellant bed. Since the filler element is arranged between the igniting mixture and the solid propellant bed, the filler element spaces the igniting mixture and the solid propellant bed from each other. In other words, the filler element serves as a separating component between the igniting mixture and the solid propellant bed.

The igniting mixture and/or the solid propellant bed comprise a plurality of molded bodies. For example, the igniting mixture and/or the solid propellant bed are formed of compressed tablets and/or of extruded members with or without axial ducts and/or of granules. The igniting mixture and the solid propellant bed may have an identical or different chemical composition. The size and/or the geometry of the molded bodies of the igniting mixture and of the molded bodies of the solid propellant bed may be designed to be identical or different.

The filler element is arranged to be movable between the igniting mixture and the solid propellant bed, as the filler element is not connected to the casing, especially the tubular casing, of the inflator. Although the filler element may be adjacent to the inside of the especially tubular inflator casing, in the idle state of the inflator no, especially permanent, adhesive and/or positive and/or non-positive connection is provided between the inflator casing and the filler element, however.

Preferably, the inner diameter of the tubular external casing of the inflator has a larger value than the outer diameter of the filler element which is supported within the external casing in the way of a loose fit such that the filler element is arranged to be sliding, especially along the longitudinal axis of the inflator. The filler element takes a substantially cylindrical shape and is supported to be sliding within the tubular external casing of the inflator, comparable to a piston-cylinder system. The afore-mentioned adjustment of the diameters of the external casing and the filler element always ensures that the filler element is movably supported within the external casing with a certain clearance without getting blocked or jammed.

The filler element is preferably disposed between the igniting mixture and the solid propellant bed such that in the idle state of the inflator the filler element fixes the igniting mixture and the solid propellant bed at their positions.

Hereinafter by the term igniting mixture the plurality of molded bodies of a booster charge is to be understood. By the term of solid propellant bed hereinafter the plurality of molded bodies of a solid propellant charge is to be understood. Nevertheless, both the igniting mixture and the solid propellant bed are to be understood as pyrotechnical fillings, wherein in the case of operation of the inflator each per se contributes by its combustion to generating a gas, especially an inflating gas for an airbag for a vehicle safety system. Due to the arrangement of the filter element between the igniting mixture and the solid propellant bed, in other words the plurality of molded bodies of the booster charge and the plurality of molded bodies of the solid propellant are thus fixed at their respective positions.

In other words, the filler element fixes both pyrotechnical fillings of the inflator in the idle state of the inflator. A relative movement of the individual molded bodies in either of the pyrotechnical fillings is to be avoided or at least considerably restricted. Inter alia, this prevents undesired shaking or rattling noise.

In addition, the filler element compensates filling tolerances of both pyrotechnical fillings.

Preferably the filler element is formed to be resilient and/or compressible and expandable. Such configuration of the filler element enables the filler element to press both onto the igniting mixture and to the solid propellant bed. This causes the igniting mixture and the solid propellant bed to be fixed in place.

When manufacturing the inflator according to the invention preferably the filler element is inserted in the inflator according to the invention in an at least slightly compressed state. If cavities are formed in the pyrotechnical filings, the filler element may expand. The fills of the pyrotechnical fillings thus are slightly compressed. In particular, the igniting mixture and the solid propellant bed are forced apart from each other as the filler element expands. In other words, a resilient and/or compressible and expandable configuration of the filler element may compensate for so called settlements in the solid propellant bed and/or in the igniting mixture. Settlements may occur, for example, by vibrations when using the inflator as specified, for example by minimal movements of individual molded bodies of the pyrotechnical fillings so that small cavities are formed in the pyrotechnical fillings. The cavities are compensated due to the resilient and/or compressible and expandable configuration of the filler element.

A compressible and expandable configuration of the filler element additionally causes the igniting mixture and/or the solid propellant bed to press also onto the filler element, if pressures are built up in the igniting mixture and/or in the solid propellant bed.

The filler element may be formed of several parts. It is possible that the filler element comprises a spring, especially a coil spring. At least one front end portion of the spring may have tapered windings. Preferably both front end portions have tapered windings. By front end portions of the spring the portions facing the igniting mixture and/or the solid propellant bed are understood. The front end portions of the spring may contact the igniting mixture or the solid propellant bed. The tapered windings provided on at least one front end portion of the spring cause such shaping of the spring that no individual molded bodies of the igniting mixture and/or of the solid propellant bed may arrive at the respective other pyrotechnical filling. Accordingly, the tapered windings fulfil a restraining function for the melded bodies on at least one front end portion.

In another embodiment of the invention, the filler element includes a terminal element especially in the form of a perforated plate and/or grid and/or expanded grid on at least one front end portion of the spring, wherein the filler element preferably includes a terminal element tightly connected to the spring on each of the two front end portions. As both front and portions include a terminal element which is tightly connected to the spring, said multi-part subassembly in total acts like a one-piece piston in a piston-cylinder system, the piston being mounted to be movable or sliding, resp., in the cylinder (external casing of the inflator). The terminal element may be a disk-shaped and/or plate-shaped element. It is moreover imaginable that the terminal element is concavely or convexly bulged. A terminal element in the form of a perforated plate and/or grid and/or expanded grid causes, in the case of operation of the inflator, gas to flow through the terminal elements and thus through the spring. Ignition fumes of the igniter and the igniting mixture must be allowed to flow through the filler element so that the solid propellant bed can be ignited.

In the present case of the inflator according to the invention the entire space in which the igniter mixture end the solid propellant bed are provided can be understood as combustion space or combustion chamber. The igniting mixture is located in a first section of the combustion chamber formed between the igniter and the filler element. The solid propellant bed is located in a second section of the combustion chamber, wherein the second section of the combustion chamber is formed between the filler element and a combustion chamber filter, for example. In the case of operation of the inflator, in the first section of the combustion chamber igniting fumes of the igniter and of the igniting mixture are generated which flow through the filler element in the direction of the second section of the combustion chamber. The direction of the gas flow thus extends starting from the igniter via the first section through the filler element in the direction of the second section of the combustion chamber.

The filler element may be a one-part component through which gas may flow. It is possible that the filler element is made of foam material especially silicone foam material, and/or as an injection-molded part, in other words, a one-part filler element has to be configured to be porous and/or to have ducts so that gas can flow through the filler element, preferably from a first section of the combustion chamber into a second section of the combustion chamber. The pore size and/or the diameter of the ducts have to be chosen so that, on the one hand, a component which is gas permeable and through which gas may flow, reap., is formed and, on the other hand, the molded bodies of the igniting mixture cannot reach through the filler element into the second section of the combustion chamber. Moreover, the molded bodies of the solid propellant bed cannot reach through the filler element into the first section of the combustion chamber.

The filler element may be arranged to be movable along the longitudinal axis of the combustion chamber in the idle state of the inflator. The longitudinal axis of the combustion chamber is understood to be the longitudinal extension of the substantially tubular inflator casing. The longitudinal axis of the combustion chamber corresponds to flow direction of a gas in the case of operation of the inflator. Due to the sliding arrangement of the filler element between the igniting mixture and the solid propellant bed, filling variations in the igniting mixture and/or in the solid propellant bed can be compensated. Moreover, the igniting mixture and the solid propellant bed are variably fixed at their positions. Filling tolerances or different filling quantities, respectively, of the two pyrotechnical fillings are compensated by virtue of the sliding arrangement of the filler element along the longitudinal axis.

By reason of the design of the inflator according to the invention comprising a movably arranged filler element the effect of the igniting mixture or, resp., the so called booster effect can be maintained for a longer period of time so that the size of the molded bodies of the solid propellant bed can be increased.

Another advantage may be perceived in the feet that the filling quantities of the igniting mixture and/or of the solid propellant bed are variable. Depending on the field of application and, resp., depending on the inflator to be designed, in the manufacturing process of the inflator different filling quantities may be selected for one or else both of the pyrotechnical fillings, which means an increased flexibility for manufacture.

The manufacture and filling, resp., is substantially facilitated due to a movably arranged filler element. It is not necessary to form any enlarged and/or prefabricated combustion chambers and/or igniter chambers. When manufacturing the inflator according to the invention, in a first step the combustion chamber, especially a second section of the combustion chamber terminated by a combustion chamber screen, is filled with a solid propellant bed. Subsequently the filler element is introduced to the combustion chamber and is put loosely onto the solid propellant bed. After that, the igniting mixture is filled into the combustion chamber, wherein the igniting mixture, while resting on the filler element, is filled into the combustion chamber. Finally the igniting unit is inserted into the external housing of the inflator, wherein a predetermined inserting or pressing force may be provided as well, and is subsequently connected to the inflator casing. The inlet aperture of the combustion chamber through which the combustion chamber has been filled with the solid propellant bed, the filler element and the igniting mixture is closed during this step.

Moreover, the weight as well as the size of the inflator according to the invention is reduced as compared to known inflators.

Within the scope of an independent aspect, the invention is based on the idea to state an airbag module comprising an afore-described inflator. The airbag module according to the invention further comprises an inflatable airbag.

Within the scope of the present invention, moreover a vehicle safety system, especially a driver, passenger, side, knee or window airbag, comprising an afore-described inflator and/or comprising an afore-described airbag module is disclosed.

Another aspect of the invention relates to providing a method of manufacturing an inflator for a vehicle safety system according to the invention, comprising the following steps of:

providing an external casing of the inflator that takes the shape of an elongate tube and is closed in the area of one end and is open at the other end;

then, feeding a first pyrotechnical filling, especially a solid propellant bed, preferably in the form of propellant tablets, into the open end of the external casing;

furthermore, inserting a filler element into the open end of the external casing, wherein the filler element delimits the first pyrotechnical filling against another second pyrotechnical filling to be fed;

after that, feeding the second pyrotechnical filling, especially an igniting mixture, into the open end of the external casing;

finally inserting an end cap including an igniter into the open end of the external casing so that the filler element is compressed.

By such manufacturing method an inflator is provided in the external casing of which a filler element can move or is movably supported between a first pyrotechnical system and a second pyrotechnical system in the idle state of the inflator, the filler element being movable similarly to a piston in a piston-cylinder system, in this case the filler element may compensate and, resp., so-to-speak automatically readjust filling tolerances and/or settlement behaviors of both pyrotechnical fillings being adjacent to the filler element.

In other words, a self-adjusting system is provided for two pyrotechnical fillings filled independently of each other.

In particular, this is a great benefit to the afore-mentioned settlement behavior. This means that, for example when an inflator is mounted in a vehicle, during driving operation for years the pyrotechnical fillings in the inflator may settle due to vibrations on or in the vehicle and hence occupy a slightly different space within the inflator. Such settlement behavior is then compensated by one single filler element at both pyrotechnical fillings.

Preferably, the afore-described manufacturing process may be extended by an additional manufacturing step, i.e. by the additional step that upon inserting the end cap the first pyrotechnical filling and/or the second pyrotechnical filling is/are compressed. In this case, for example, the afore-mentioned settlement behavior of the pyrotechnical fillings can be reduced.

Moreover, another method step can be carried out when manufacturing the inflator, i.e. the method step that upon insertion of the end cap a front end portion of the filler element positioned more closely to the end cap experiences larger positional displacement than a front end portion of the filler element positioned more distant from the end cap. In this way a particular mechanical bias may be applied to the two pyrotechnical fillings, which causes the position thereof to be optimally fixed.

BRIEF DESCRIPTION OF THE DRAWINGS

In connection with the airbag module and/or the vehicle safety system advantages similar to those already stated in connection with the inflator according to the invention are resulting.

Hereinafter the invention will be explained in detail by way of embodiments with reference to the enclosed schematic drawings, in which.

DESCRIPTION

Figure 1:
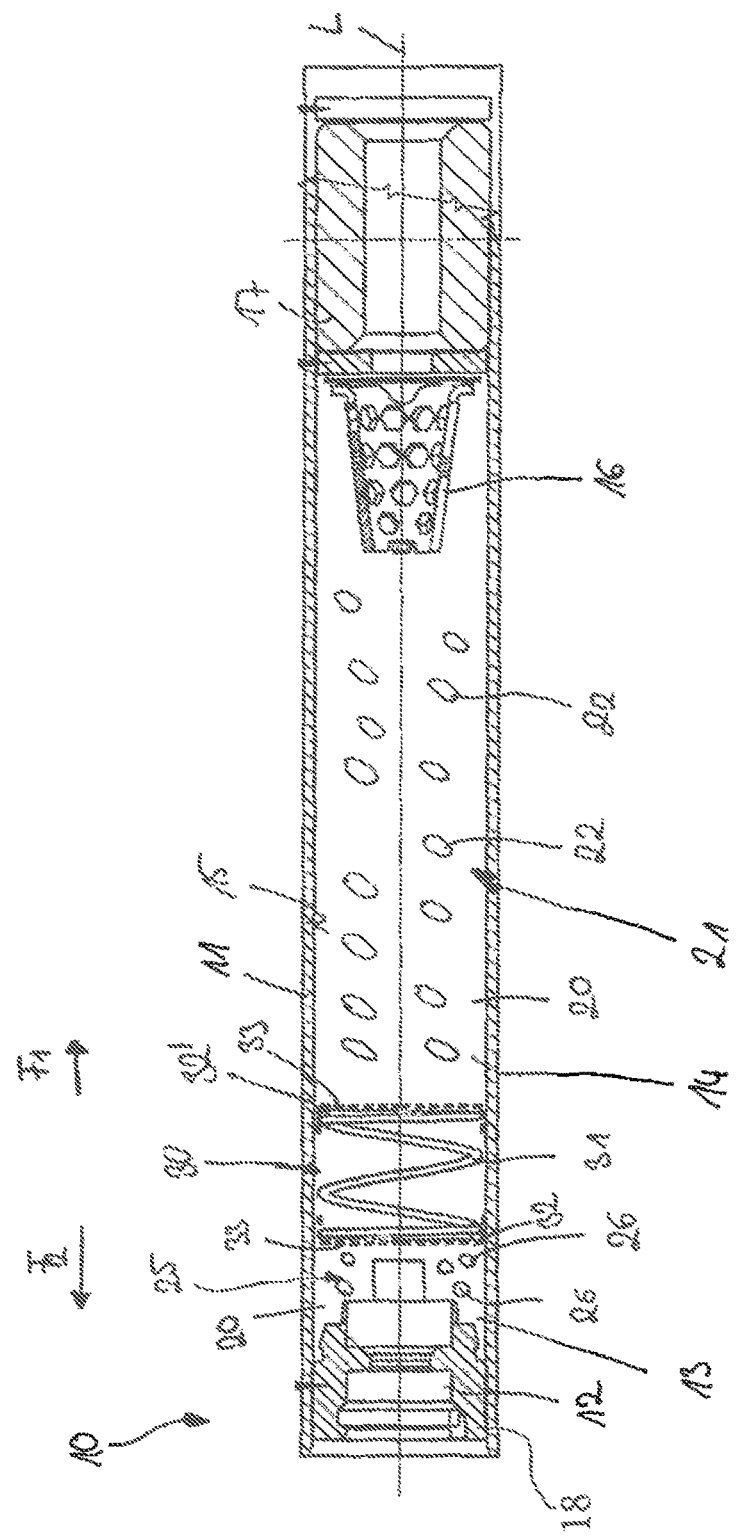
FIG. 1 shows a longitudinal sectional view across an inflator of a side airbag.

In FIG. 1 an inflator 10 in the form of an elongate tubular inflator is illustrated. The external casing 11 has a total length which is more than four times, especially more than eight times, the diameter. On the shown left end of the inflator 10 an end cap 18 comprising an igniter 12 is arranged. The end cap 18 may be made from different materials, for example from metal such as aluminum or steel, or else from an injectable plastic material for mounting the igniter 12 to the external casing 11 by plastic injection, in the present case, the end cap 18 is formed of steel and is tightly welded to the external casing 11 along its radial circumference by a laser weld applied from outside through the external casing 11. The end cap 18 together with the comprising igniter 12 may constitute a prefabricated subassembly. Also the igniter 12 may be a prefabricated self-contained unit wherein the igniter 12 on its own may comprise plural layers or charges of different pyrotechnics, especially regarding the chemical composition and/or the geometry or grain size. An elongate combustion chamber 20 is adjacent to the igniter 12. In the combustion chamber 20 a pyrotechnical solid propellant bed 21 as well as an igniting mixture 25 is provided. Both the solid propellant bed 21 and the igniting mixture 25 are illustrated merely schematically and comprise respective pyrotechnical fillings. The solid propellant bed 21 consists of a fill of individual propellant tablets 22. The igniting mixture 21 equally consists of a fill of individual pyrotechnical molded bodies 26. The geometric shape of the propellant tablets 22 or the pyrotechnical molded bodies 26 may also be cylindrical, granular or ring-shaped. The shown gaps between the individual propellant tablets 22 or, resp., between the pyrotechnical molded bodies 26 are equally illustrated merely schematically and are not sized in such way in a realized inflator 10 but are usually smaller than the dimensions of the individual elements of the pyrotechnical fillings.

The igniting mixture 25 is arranged in a first section 13 of the combustion chamber 20. The solid propellant bed 12, on the other hand, is located in a second section 14 of the combustion chamber 20. The first section 13 of the combustion chamber 20 reaches from the igniter 12 to a filler element 30. The second section 14 of the combustion chamber 20 is understood to be a subsequent section of the combustion chamber 20 which is formed between the filler element 30 and a combustion chamber filter 16.

Between the igniting mixture 25 and the solid propellant bad 21 the filler element 30 is arranged to be movable. The filler element 30 is not tightly connected to the inner side 15 of the external casing 11. It is possible that the filler element 30 contacts at least portions of the inner side 15 of the external casing 11. However, the filler element is not fixed to the inner side 15 of the external casing 11.

In FIG. 1 the inflator 10 according to the invention is shown in an idle state, i.e. in a non-activated state. Accordingly, the igniter 12 is not activated or ignited, respectively. The filler element 30 is arranged, in the idle state of the inflator 10, between the igniting mixture 25 and the solid propellant bed 21 so that the filler element 30 fixes the igniting mixture 25 and the solid propellant bed 21 at their respective positions. A relative movement of the individual propellant tablets 22 and/or of individual pyrotechnical molded bodies 26 is prevented or minimized with the aid of the filler element 30. The filler element compensates for filling tolerances of both pyrotechnical fillings. i.e. of both the igniting mixture 25 and the solid propellant bed 21.

In the activated state (not shown) of the inflator 10 the igniter 12 is or has been activated and thus the igniting mixture 25 is or has been ignited, thus causing igniting fumes to flow from the first section 13 of the combustion chamber 20 through the filler element 30 in the direction of the second section 14 of the combustion chamber, which causes the propellant tablets 22 of the solid propellant bed 21 to be ignited. Subsequently, the gas generated in the combustion chamber flows in the direction of the combustion chamber filter 16. By the term igniting fumes or gas, resp., in this case a particular share of hot particles is to be understood apart from hot gas. In the illustrated idle state of the inflator 10 the filler element is arranged to be sliding along the longitudinal axis L of the inflator 10. The flow direction of the gas substantially corresponds to the extension of the longitudinal axis L of the inflator 10.

The filler element 30 in FIG. 1 is resilient and includes several components. In the shown example the filler element comprises a spring 31. The spring 31 takes the shape of a coil spring and includes two front end portions 32 and 32'. The first front end portion 32 points in the direction of the first section 13 of the combustion chamber 20 and, resp., in the direction of the igniter and, resp., in the direction of the igniting mixture 25. The opposite second front end portion 32' points to the second section 14 of the combustion chamber 20 and, resp., in the direction of the solid propellant bed 21 and, resp., in the direction of the combustion chamber filter 16.

The filler element 30 includes a closure element 33 especially in the form of a perforated plats and/or a grid and/or an expanded grid on both front end portions 32, 32' of the spring 31. The shown closure elements 33 are disk-shaped and include apertures so that, in the case of operation of the inflator 10, gas may flow through the filter element 30. It is also possible that the closure elements 33 have a curved shape. Moreover, the closure elements 33 have a screening function. The pyrotechnical molded bodies 26 of the igniting mixture 25 cannot get through the filler element 30 into the second section 14 of the combustion chamber 20. The propellant tablets 22 of the solid propellant bed 21 are not capable of reaching through the filler element 30 into the first section 13 of the combustion chamber 20.

The filler element 30 is resilient, with a spring force acting in two directions, namely in the directions F1 and F2. In this way the igniting mixture 25 and the solid propellant bed 21 are fixed at their respective positions. In the case of operation, igniting fumes of the igniter 12 and the igniting mixture 25 may flow through the filler element 30. The generated igniting fumes thus flow in the direction F1 into the second section 14 of the combustion chamber 20 and hence in the direction of the solid propellant bed 21.

Figure 2:
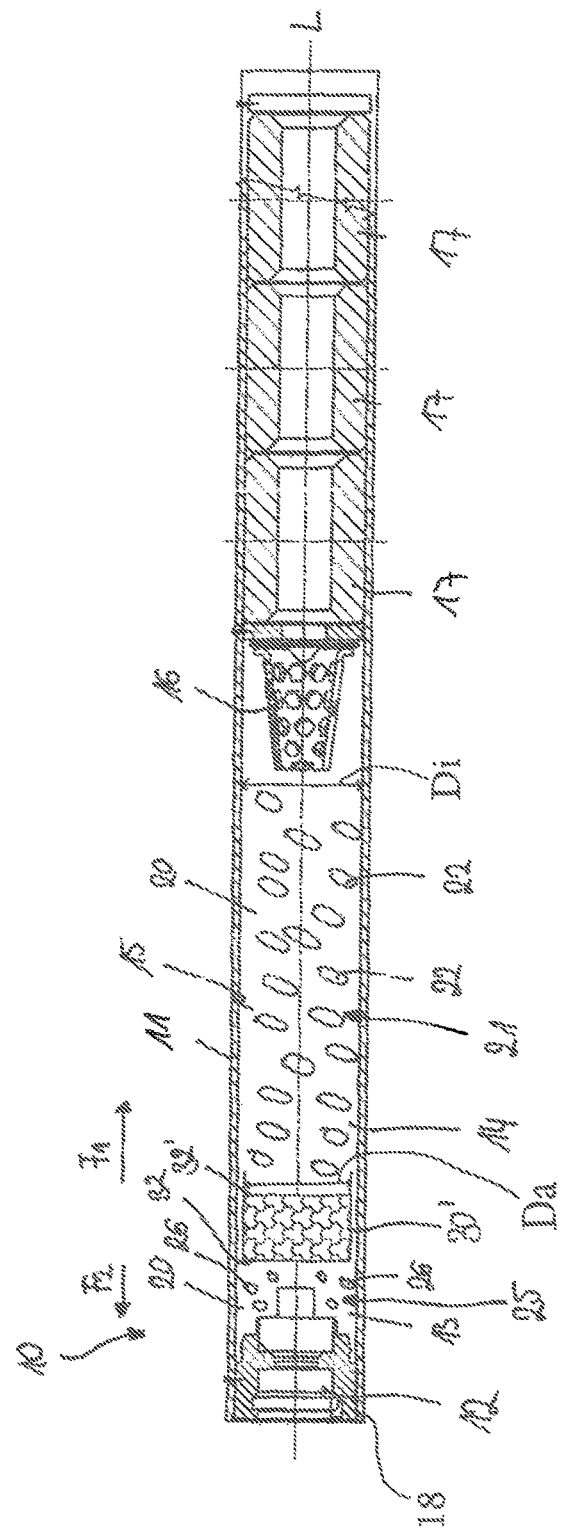
FIG. 2 shows a longitudinal sectional view across an inflator of a knee airbag.

In FIG. 2 an inflator 10 for a knee airbag is illustrated in the longitudinal section. In FIG. 2 equal reference numerals are used for equal and equally acting parts vis-à-vis components of FIG. 1.

In contrast to FIG. 1, in FIG. 2 a one-part filler element 30' is illustrated. This filler element 30', too, is arranged to be movable between the igniter mixture 25 and the solid propellant bed 21. The one-part filler element 30' is in the form of a component through which gas may flow. The one-part filler element 30' is formed of foam material, especially silicone foam material, and/or as an injection-molded part. Preferably the one-part filler element 30' is made from such material which acts like a spring and is configured to be compressible and expandable, respectively.

Similarly to the spring 31 of FIG. 1, the one-part filler element 30' causes two forces to act in the directions F1 and F2 so that the igniting mixture 25 and the solid propellant bed 21 are fixed in their respective positions in the idle state of the inflator 10. The one-part filler element 30' is not connected to the external casing 11 of the inflator 10, either. The shown clearance between the inner side 15 of the external casing 11 and the filler element 30' is to be understood as a schematic representation only, however. In fact, the filler element 30' may be adjacent at least to portions of the inner side 15 of the external casing 11, wherein it has always to be ensured that the filler element 30' is sliding along the longitudinal axis L of the inflator 10 in the idle state of the inflator 10.

The filler element 30' may easily compress and expand when it is not connected to the inflator 10 and, resp., is not fixed to the inner side 15 of the external casing 11. On the one hand, the distance between the filler element 30' and the inner side 15 of the external casing 11 has to be kept so small that no propellant tablets 22 get into the first section 13 of the combustion chamber 20 and no pyrotechnical molded bodies 26 get into the second section 14 of the combustion chamber 20.

On the other hand, the filler element 30' is to be supported to be smooth-running or sliding in the tubular external casing 11, similarly to a loose fit, so that the filler element 30; does not get blocked or jammed when it is displaced along the longitudinal axis L of the inflator. Therefore the inner diameter Di of the external casing 11 of the inflator 10 has a higher value than the outer diameter Da of the filler element 30'. In FIG. 2 the inner diameter Di of the external casing 11 is sketched by an arrow head having two points. In the same way the external diameter Da of the filler element 30' is marked, wherein in this case an axially extending prolonging auxiliary line is further inserted along the outer peripheral surface of the filler element 30' so as to unambiguously mark the two final points of the arrow head for the outer diameter Da.

The filler element 30' formed in one part moreover is porous and/or includes through-passages so that igniting fumes of the igniter 12 and of the igniting mixture 25 pass from the first section 13 of the combustion chamber 20 through the filler element 30' into the second section 14 and thus into the area of the solid propellant bed 21. Due to the design of the filler element 30' which is porous and/or interspersed with ducts, the igniting fumes enter into the filler element 30' at the first front end portion 32 and arrive at the second front end portion 32'. The second section 14 of the combustion chamber 20 starts at the second front end portion 32' of the filler element 30' so that the igniting fumes enter into the second section 14 of the combustion chamber 20 starting from the second front end portion 32' so that the solid propellant bed 21 can be ignited.

The formed gas exits the combustion chamber 20 through the combustion chamber screen 16. It is possible that the generated gas flows through a filter group 17 after exiting the combustion chamber screen 16. Three filter groups 17 are illustrated merely by way of example in FIG. 2.

LIST OF REFERENCE NUMERALS 10 inflator
11 external casing
12 igniter
13 first section of combustion chamber
14 second section of combustion chamber
15 inner side of external casing
16 combustion chamber filter
17 filter group
18 end cap
20 combustion chamber
21 solid propellant bed, first pyrotechnical filling
22 propellant tablet
25 igniting mixture, second pyrotechnical filling
26 pyrotechnical molded body
30, 30' filler element
31 spring
32, 32' front end portion
33 closure element
L longitudinal axis
F1, F2 directions of force
Di inner diameter of external casing
Da outer diameter of filler element

The invention claimed is:

1. An inflator (10) comprising:
   a combustion chamber (20),
   a pyrotechnical solid propellant bed (21) and an igniting mixture (25) located within the combustion chamber (20), and
   a compressible filler element (30, 30') engaging the igniting mixture (25) and the propellant bed (21) and being arranged to be movable between the igniting mixture (25) and the solid propellant bed (21) in the idle state of the inflator (10).

2. The inflator (10) according to claim 1, wherein an inner diameter (Di) of a tubular external casing (11) of the inflator (10) has a higher value than an outer diameter (Da) of the filler element (30, 30') which is supported within the external casing (11) in the manner of a loose fit such that the filler element (30, 30') is arranged to be sliding along the longitudinal axis (L) of the inflator (10).

3. The inflator (10) according to claim 1, wherein the filler element (30) is arranged between the igniting mixture (25) and the solid propellant bed (21) so that the filler element (30, 30') fixes the igniting mixture (25) and the solid propellant bed (21) at their respective positions in the idle state of the inflator (10).

4. The inflator (10) according to claim 1, wherein the filler element (30) comprises a spring (31), wherein at least one front end portion (32, 32') of the spring (31) includes tapered windings.

5. The inflator (10) according to claim 4, wherein the at least one front end portion (32, 32') of the spring (31) includes a closure element (33) fixedly connected to the spring (31).

6. The inflator (10) according to claim 3, wherein the filler element (30, 30') is a one-part component through which gas may flow.

7. The inflator (10) according to claim 1, wherein the filler element (30, 30') is made from foam material, especially silicone foam material, and/or is designed as an injection-molded part.

8. The inflator (10) according to claim 1, wherein in the case of operation of the inflator (10) gas can flow through the filler element (30, 30').

9. The inflator according to claim 1, wherein the igniting mixture engaged by the filler element contacts an ignitor of the inflator in the idle state of the inflator.

10. The inflator according to claim 1, wherein each end portion of the filler element includes a closure element comprising a plate with apertures through which gas can flow in the case of operation of the inflator.

11. An inflator comprising:
    a combustion chamber,
    a pyrotechnical solid propellant bed and an igniting mixture (25) located within the combustion chamber (20), and
    a filler element including a spring having end portions and a plate with apertures secured to each end portion, the filler element being arranged to be movable between the igniting mixture and the solid propellant bed in the idle state of the inflator.

* * * * *